United States Patent
Zeng et al.

(10) Patent No.: US 11,076,388 B2
(45) Date of Patent: Jul. 27, 2021

(54) CONFIGURABLE COMMON UPLINK BURST LENGTH

(71) Applicant: QUALCOMM Incorporated, San Diego, CA (US)

(72) Inventors: Wei Zeng, Cupertino, CA (US); Tingfang Ji, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 15/868,529

(22) Filed: Jan. 11, 2018

(65) Prior Publication Data

US 2018/0206226 A1 Jul. 19, 2018

Related U.S. Application Data (60) Provisional application No. 62/446,307, filed on Jan. 13, 2017.

(51) Int. Cl.
*H04W 88/08* (2009.01)
*H04W 88/02* (2009.01)
(Continued)

(52) U.S. Cl.
CPC ....... *H04W 72/0413* (2013.01); *H04L 5/0053* (2013.01); *H04L 5/0092* (2013.01);
(Continued)

(58) Field of Classification Search
CPC .............................. H04W 88/02; H04W 76/27
See application file for complete search history.

(56) References Cited

U.S. PATENT DOCUMENTS

| | | | |
|---|---|---|---|
| 6,094,421 A | 7/2000 | Scott | |
| 9,042,321 B2 | 5/2015 | Ko et al. | |

(Continued)

FOREIGN PATENT DOCUMENTS

| | | | |
|---|---|---|---|
| CN | 101136703 A | 3/2008 | |
| CN | 101478701 A | 7/2009 | |

(Continued)

OTHER PUBLICATIONS

"3rd Generation Partnership Project; Technical Specification Group Radio Access Network; Evolved Universal Terrestrial Radio Access (E-UTRA); Physical channels and Modulation (Release 14)", 3GPP Standard; 3GPP TS 36.211, 3rd Generation Partnership Project (3GPP), Mobile Competence Centre; 650, Route Des Lucioles; F-06921 Sophia-Antipolis Cedex; France, vol. RAN WG1, No. V14.1.0, Jan. 2, 2017, pp. 8-68, XP051230333, [retrieved on Jan. 2, 2017].

(Continued)

*Primary Examiner* — Angel T Brockman
(74) *Attorney, Agent, or Firm* — Arent Fox, LLP (57) ABSTRACT

Various aspects are provided for dynamic configuration of common uplink bursts. For example, the described apparatus and methods include receiving, at a user equipment (UE), an indicator of a length of a common uplink burst from a gNB, configuring the common uplink burst having the length as identified by the indicator, and transmitting, from the UE, the common uplink burst to the gNB.

33 Claims, 8 Drawing Sheets

(51) Int. Cl.
*H04W 72/04* (2009.01)
*H04W 76/27* (2018.01)
*H04L 5/00* (2006.01)

(52) U.S. Cl.
CPC ....... *H04L 5/0094* (2013.01); *H04W 72/0446* (2013.01); *H04W 76/27* (2018.02); *H04W 88/02* (2013.01); *H04W 88/08* (2013.01)

(56) References Cited

U.S. PATENT DOCUMENTS

| | | | |
|---|---|---|---|
| 9,363,797 B2 | 6/2016 | Freda et al. | |
| 2009/0010198 A1* | 1/2009 | Boariu | H04W 72/1289 370/315 |
| 2011/0255453 A1 | 10/2011 | Roh et al. | |
| 2013/0286902 A1 | 10/2013 | Chen et al. | |
| 2015/0003346 A1* | 1/2015 | Kim | H04L 5/001 370/329 |
| 2016/0205664 A1 | 7/2016 | Zhang et al. | |
| 2017/0111930 A1* | 4/2017 | Rajagopal | H04B 7/0626 |

FOREIGN PATENT DOCUMENTS

| | | |
|---|---|---|
| CN | 101796762 A | 8/2010 |
| CN | 102137503 A | 7/2011 |
| CN | 102791003 A | 11/2012 |
| CN | 103813438 A | 5/2014 |
| EP | 3096578 A1 | 11/2016 |
| WO | 2016120172 A1 | 8/2016 |

OTHER PUBLICATIONS

Huawei., et al., "Overview of 5G frame structure," 3rd Generation Partnership Project (3GPP); 3GPP Draft; R1-162157, Mobile Competence Centre ; 650, Route Des Lucioles ; F-06921 Sophia-Antipolis Cedex; France; vol. RAN WG1, No. Busan, Korea; Apr. 11, 2016-Apr. 15, 2016; Apr. 2, 2016 (Apr. 2, 2016), XP051080003, pp. 6. Retrieved from the Internet: URL: http://www.3gpp.org/ftp/tsg_ran/WG1_RL1/TSGR1_84b/Docs/ [retrieved on Apr. 2, 2016].
International Search Report and Written Opinion—PCT/US2018/013538—ISA/EPO—dated Mar. 20, 2018.
Qualcomm Incorporated: "Common Short UL Burst for Delay Sensitive Control and Data", 3GPP Draft; R1-1612071, 3rd Generation Partnership Project (3GPP), Mobile Competence Centre; 650, Route Des Lucioles; F-06921 Sophia-Antipolis Cedex; France, vol. RAN WG1, No. Reno, U.S.A; Nov. 14, 2016-Nov. 18, 2016 Nov. 13, 2016 (Nov. 13, 2016), XP051176031, Retrieved from the Internet: URL:http://www.3gpp.org/ftp/Meetings_3GPP_SYNC/RAN1/Docs/ [retrieved on Nov. 13, 2016], 6 pages.

* cited by examiner

CONFIGURABLE COMMON UPLINK BURST LENGTH

CROSS-REFERENCE TO RELATED APPLICATION

The present application for patent claims priority to Provisional Application No. 62/446,307 entitled "Configurable Common Uplink Burst Length" filed Jan. 13, 2017, which is assigned to the assignee hereof, and incorporated herein by reference in its entirety.

BACKGROUND

The present disclosure relates generally to signaling in wireless networks, and more particularly, to transmission of common uplink burst in wireless networks.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, wideband CDMA (W-CDMA) systems, time division multiple access (TDMA) systems, frequency division multiple access (FDMA) systems, orthogonal frequency division multiple access (OFDMA) systems, wide band single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. For example, 5G NR (new radio) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with requirements, especially in terms of latency and reliability; and massive machine type communications for a very large number of connected devices, and typically transmitting a relatively low volume of non-delay-sensitive information. However, as the demand for mobile broadband access continues to increase, there exists a need for further improvements in 5G communications technology and beyond. Preferably, these improvements should be applicable to other multi-access technologies and the telecommunication standards that employ these technologies.

In 5G/NR wireless networks, a guard interval is present to minimize gNB to gNB interference when switching from downlink to uplink and/or uplink to downlink. The guard interval may be long and may result in switching overhead.

Therefore, there is a desire for a method and an apparatus to reduce the switching overhead due to the presence of the guard interval in 5G/NR networks.

SUMMARY OF THE INVENTION

Various aspects are provided for dynamic configuration of common uplink bursts.

In an aspect, the disclosure provides a method of wireless communication implemented by a UE. The method may include receiving, at a UE, an indicator of a length of the common uplink burst from a gNB, configuring, at the UE, the common uplink burst having the length as identified by the indicator received from the gNB, and transmitting, from the UE, the common uplink burst to the gNB.

In an aspect, the disclosure provides a method of wireless communication implemented by a base station (e.g., gNB). The method may include transmitting, from a gNB, an indicator of a length of a common uplink burst to a UE, and receiving, at the gNB, the common uplink burst from the UE, wherein the common uplink burst has the length identified by the indicator transmitted from the gNB.

In an aspect, the disclosure provides an apparatus, such as a UE, for wireless communications. The apparatus may include a transceiver, a memory that stores instructions, and a processor communicatively coupled to the transceiver and the memory. The processor may be configured to execute the instructions to receive an indicator of a length of the common uplink burst from a gNB, configure the common uplink burst having the length identified by the indicator received from the gNB, and transmit the common uplink burst to the gNB.

In another aspect, the disclosure provides an apparatus for wireless communications, such as a UE. The apparatus may include means for receiving an indicator of a length of the common uplink burst from a gNB, means for configuring the common uplink burst having the length as identified by the indicator received from the gNB, and means for transmitting the common uplink burst to the gNB.

In an aspect, the disclosure provides a computer-readable medium storing computer executable code for wireless communications, such as by a UE. The computer-readable medium may include code for receiving an indicator of a length of the common uplink burst from an gNB, code for configuring the common uplink burst having the length as identified by the indicator received from the gNB, and code for transmitting the common uplink burst to the gNB.

In an aspect, the disclosure provides an apparatus, such as a gNB, for wireless communications. The apparatus may include a transceiver, a memory that stores instructions, and a processor communicatively coupled to the transceiver and the memory. The processor may be configured to transmit an indicator of a length of a common uplink burst to a UE, and receive the common uplink burst from the UE, wherein the common uplink burst has the length identified by the indicator transmitted from the gNB.

In an aspect, the disclosure provides an apparatus, such as a gNB, for wireless communications. The apparatus may include means for transmitting an indicator of a length of a common uplink burst to a UE, and means for receiving the common uplink burst from the UE, wherein the common uplink burst has the length identified by the indicator transmitted from the gNB.

In an aspect, the disclosure provides a computer-readable medium storing computer-executable code for wireless communications, such as by a gNB. The computer-readable medium may include code for code for transmitting an indicator of a length of a common uplink burst to a UE, and code for receiving the common uplink burst from the gNB, wherein the common uplink burst has the length identified by the indicator transmitted from the gNB.

It is understood that other aspects of apparatuses and methods will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present disclosure provides an example method, an apparatus, and/or a computer readable medium for transmitting a common uplink burst from a user equipment (UE), which may include receiving an indicator of a length of the common uplink burst from a gNB, configuring the common uplink burst of the length corresponding to the indicator received from the gNB, and transmitting the common uplink burst to the gNB. The UE may receive the length of the common uplink burst via or as a part of one or more of a downlink control information (DCI), an uplink control information (UCI), a slot format indicator, a control format indicator channel, or a radio resource control (RRC) reconfiguration message. The indicator may further identify, explicitly or implicitly, a position of the common uplink burst, such as a starting symbol number within a slot, a position relative to an end of the slot, etc. In some aspects, the common uplink burst may include a relatively longer common uplink burst, as compared to a typical common uplink burst. For example, in some implementations, the common uplink burst may be carried by a physical uplink control channel (PUCCH) of one or two symbols in length, as such, the longer common uplink burst may utilize two or more sets of PUCCH resources. For example, a typical PUCCH resource used for a typical common uplink burst may be one or two symbols in length. As such, for example, the longer common uplink burst using multiple PUCCH resources may be greater than two symbols in length. For instance, in some implementations, a longer common uplink burst may have a length of four symbols or more, such as but limited to a length between four and fourteen symbols. Such longer common uplink burst thus have a relatively higher information capacity, such as to carry more information, including information from multiple UEs, or aggregated information when slot aggregation is in use.

Figure 1:
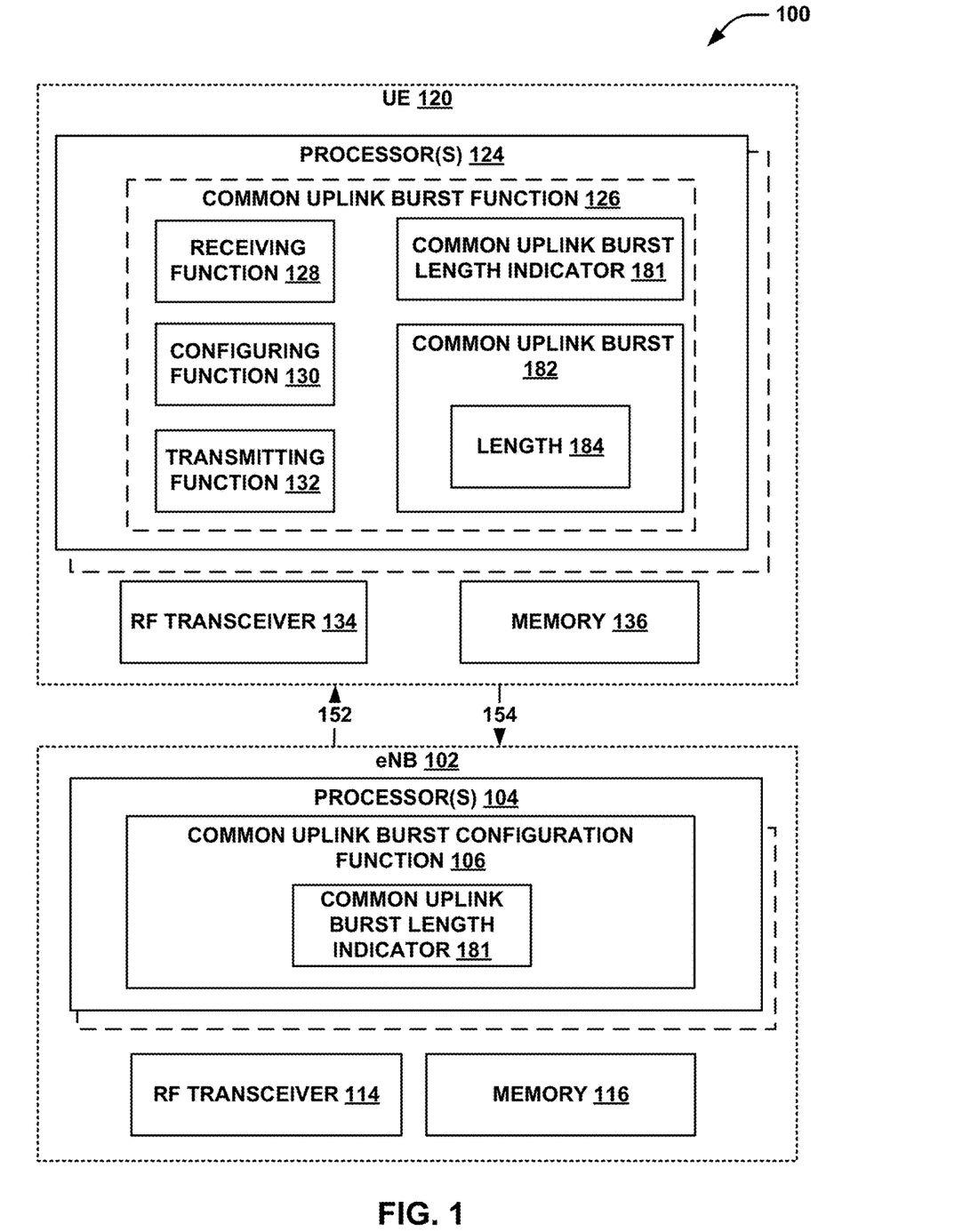
FIG. 1 is an example schematic diagram of a wireless communications system including a user equipment having aspects of a common uplink burst function in a wireless network.

Referring to FIG. 1, in an aspect, a wireless communication system 100 includes a user equipment (UE) 120, one or more processors 124, and/or a common uplink burst function 126 running on a processor 124 (or processors 124 in a distributed computing environment) for transmitting a common uplink burst 182 having a common uplink burst length 184 from UE 120. The common uplink burst 182 may be present in a downlink centric slot and/or a uplink centric slot, and may be generally be used for transmitting time sensitive information from UE 120 to gNB 102. For example, common uplink burst 182 may carry control information, and optionally, data information. Suitable examples of information carried by common uplink burst 182 include, but are not limited to, information such as logical information (e.g., an ACK or a NACK), a scheduling request, channel state information (CSI), channel quality information (CQI), and a sounding reference signal (SRS). In an aspect, UE 120 and/or common uplink burst function 126 may further include a receiving function 128 for receiving the common uplink burst length indicator 181 for use in configuring the common uplink burst 182 from a base station or gNB 102, a configuring function 130 for configuring the common uplink burst 182 with the length 184 based on the length identified by the common uplink burst indicator 181 received from the gNB, a transmitting function 132 for transmitting the common uplink burst 182 having the length 184 to the gNB. UE 120 may further include a radio frequency (RF) transceiver 134 for carrying out the transmitting and receiving operations in cooperation with the processor(s) 124, and/or a memory 136 operable in conjunction with the processor(s) 124 for storing computer-readable medium, executable by the processor(s) 124, defining one or more functionalities described herein to enable the UE 120 to configure and transmit the common uplink burst 182 with the variable length 184.

Wireless communication system 100 further includes one or more gNBs 102 having one or more processors 104, and/or a common uplink burst configuration function 106 running on processor 104 (or processors 104 in a distributed computing environment), for sending common uplink burst length indicator 181 to UE 120. The common uplink burst configuration function 106 may generate and transmit the common uplink burst length indicator 181 via or as a part of one or a combination of a downlink control information (DCI), an uplink control information (UCI), a slot format indicator, a control format indicator channel, or a radio resource control (RRC) reconfiguration message. The common uplink burst length indicator 181 may further identify, explicitly or implicitly, a position of the common uplink burst, such as a starting symbol number within a slot, a position relative to an end of the slot, etc. The gNB 102 may further include an RF transceiver 114 for carrying out the transmitting operations in cooperation with the processor(s) 104, and/or a memory 116 operable in conjunction with the processor(s) 104 for storing computer-readable medium, executable by the processor(s) 104, defining one or more functionalities described herein to enable the gNB 102 to control the length 184 of the common uplink burst 182 transmitted by the UE 120, e.g., by determining and transmitting the common uplink burst length indicator 181.

In some implementations, a gNB communicating with a number of UEs may desire means for easily determining the slot position of control information within frames transmitted to the gNB. In such aspects, common uplink bursts address this issue by providing control information that is transmitted in a consistent format across neighboring UEs. Because these specialized uplink bursts formats may be considered to be "common" to all UEs in communication with a gNB, dynamic modification of the common uplink burst structure may involve coordination by the gNB to reduce the likelihood of collisions.

UE 120 may be in communication with gNB 102 via one or more over-the-air links, e.g., downlink (DL) 152 and/or uplink (UL) 154. In an aspect, DL 152 is generally used for communication from gNB 120 to UE 102 and UL 154 is generally used for communication from UE 102 to gNB 120. For example, gNB 102 may transmit common uplink burst length 181 to UE 102 via downlink 152 and/or UE 120 may transmit common uplink burst 182 via uplink 154.

UE 120 may be a mobile wireless communication device and may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

The gNB 102 may be a wireless communication device such as a base station (BS) or Node B or eNodeB, a macro cell, a small cell (e.g., a femtocell, or a pico cell), a relay, a peer-to-peer device, etc. In an example aspect, the nodes may operate according to wireless local area network (WLAN) specification as defined in IEEE 802.11 and/or may operate according to Wideband Code Division Multiple Access (W-CDMA), Code Division Multiple Access (CDMA), Time Division Synchronous Code Division Multiple Access (TD-SCDMA), Long Term Evolution (LTE), Global System for Mobile Communications (GSM), and/or a 5G (NR) standard as defined in 3GPP Specifications.

Figure 2:
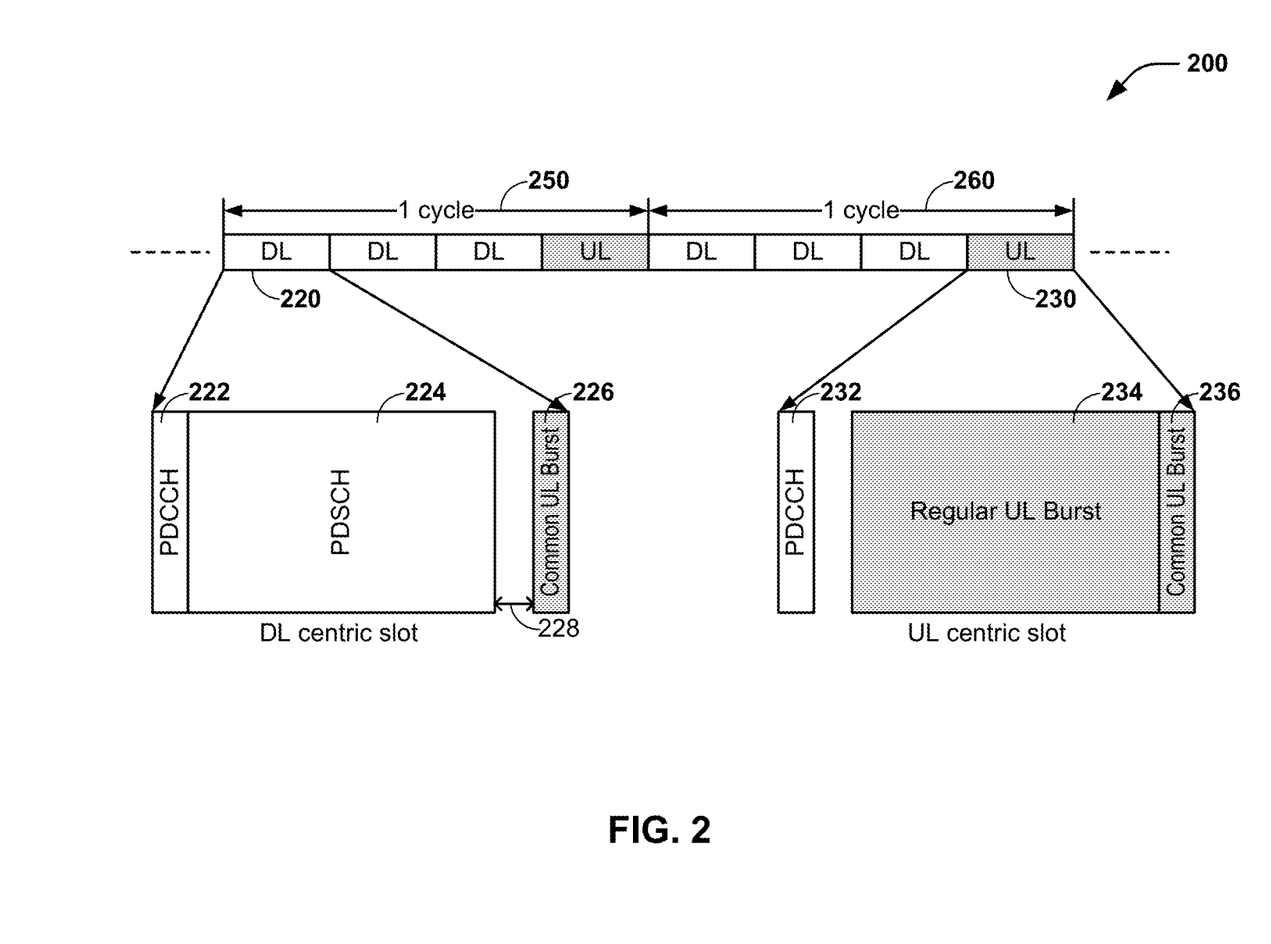
FIG. 2 illustrates an example slot (or frame) structure including a downlink centric slot and/or an uplink centric slot.

FIG. 2 illustrates an example slot (or frame) structure 200 including a downlink centric slot (220) and/or a uplink centric slot (230) each having a common uplink burst with a dynamically configurable length. Slots within slot structure 200 may have one or more of a variety of slot formats, such as including different uplink and/or downlink resource (e.g., symbol) configurations of slots. In some cases, for instance, each of a set of different slot formats include a plurality of symbols (e.g., identified by respective symbol numbers, such as symbols 0 to 13 in a slot having a length of 14 symbols), where one or more of the same symbol numbers across the different slot formats may be used for the common uplink burst, and hence are "common" uplink burst resources. For example, one slot format may have mostly downlink-centric symbols (e.g., a downlink-centric slot), while another slot format may have an even mix of downlink-centric and uplink-centric symbols, while yet another slot format may have mostly uplink symbols (e.g., an uplink-centric slot). In some instances, the symbols used for the common uplink burst may be positioned at or toward the end of the slot, although this disclosure is not limited to such a configuration. In any case, one or more sets or subsets of available slot formats may have a set of symbols used for the common uplink burst in the same position (e.g., at the same symbol numbers) within the slot. Further, slot formats that have "short format" common uplink bursts may have one or two symbols for a common uplink burst. Conversely, slot formats that have "long format" common uplink bursts, referred to as "longer common uplink bursts," may have room for multiple common uplink burst symbols, such as but not limited to, greater than two symbols, greater than four symbols, or, in some cases, from four to fourteen symbols.

In a non-limiting example, each of cycles 250 and 260 includes three downlink centric slots and one uplink centric slot. Although each cycle is shown with four slots, a cycle may be configured with any number of slots and/or any type of slots (e.g., any combination of downlink and/or uplink slots).

As illustrated in FIG. 2, the downlink centric slot 220 may include a physical downlink control channel (PDCCH) 222, a physical downlink shared channel (PDSCH) 224, and/or a common uplink burst 226; and the uplink centric slot 230 may include a PDCCH 232, a regular uplink burst 234, and/or a common uplink burst 236. Common uplink burst 226 and common uplink burst 236 may be the same as or similar to common uplink burst 182 of FIG. 1. In prior solutions, the common uplink bursts 226 and 236 may have been of fixed length, e.g., one symbol or two half symbols, but according to the present aspects they may have a variable length as indicated by gNB 102 (FIG. 1). In one implementation, a guard interval 228 may separate PDSCH 224 and common uplink burst 226 and may be at least 3 symbols in length to minimize or avoid gNB to gNB interference.

For example, in some macro cell deployments, transmissions from one gNB may propagate to a neighbor gNB and may cause interference. The interference may be higher if one gNB is in the transmission mode and the other gNB is in a reception mode. That is, downlink transmissions of one gNB may interfere with UL receptions of another gNB. The guard interval may alleviate some of the concerns related to gNB to gNB interference by containing the interference within the duration of the guard interval, however, in NR/5G, the gNB to gNB interference may not be fully contained within the guard interval. Additionally, a physical uplink control channel (PUCCH) transmitted from UE 120 may be designed based on the length of the common uplink bursts, e.g., 226 and/or 236.

In one implementation, the guard interval may be three symbols in length. It should also be noted that there may be another guard interval between common uplink burst 226 and PDCCH 232. However, the guard interval between common uplink burst 226 and PDCCH 232 may be smaller than guard interval 228 as the guard interval between common uplink burst 226 and PDCCH 232 separates uplink transmissions from UE 120, which are transmitted at a much lower power (when compared to the power level of transmission from gNB) from downlink transmissions from gNB 102.

Figure 3:
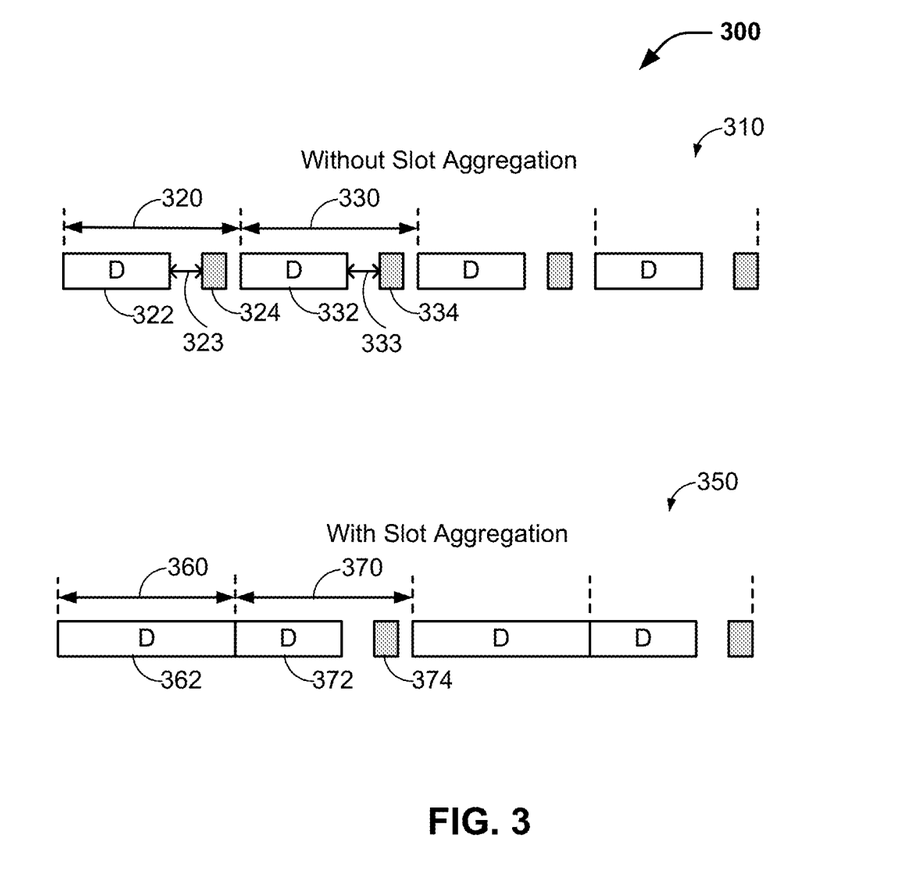
FIG. 3 illustrates example downlink centric slot structures without slot aggregation and with slot aggregation.

FIG. 3 illustrates example slot structures 300 without slot aggregation 310 and with slot aggregation 350 each having a common uplink burst with a dynamically configurable length. Although slot structures 300 include downlink centric slots, it should be understood that the same or similar principles can be applied to uplink centric slots. For example, FIG. 3 illustrates a slot structure 310 which includes downlink centric slots 320 and 330. Downlink centric slot 320 includes PDCCH/PDSCH 322, common uplink burst 324, and/or a guard interval 323. Downlink centric slot 330 includes PDCCH/PDSCH 332, common uplink burst 334, and/or a guard interval 333. Common uplink burst 324 and common uplink burst 334 may be the same as or similar to common uplink burst 182 of FIG. 1. However, the presence of guard intervals in every slot (e.g., downlink centric slot and/or uplink centric slots), may increase switching overhead and/or may result in data transmissions at lower speeds or higher delays.

To address such concerns, a slot structure 350 which may include slot aggregation may be utilized. For example, downlink centric slots 360 and 370 may be aggregated and transmitted with one common uplink burst 374. However, the aggregation of two (or more) downlink centric slots being transmitted with a single common uplink burst 374 may lead to higher capacity requirements of common uplink burst. For example, as the aggregated downlink transmissions in the downlink centric slots support more users, the common uplink burst 374 should be able to support uplink control feedback for more users, e.g., should be able to transmit time sensitive information without delays. As such, common uplink burst 374 may be the same as or similar to common uplink burst 182 of FIG. 1, e.g., having length 184 that is variable and dynamically configurable by gNB as described herein.

Figure 4:
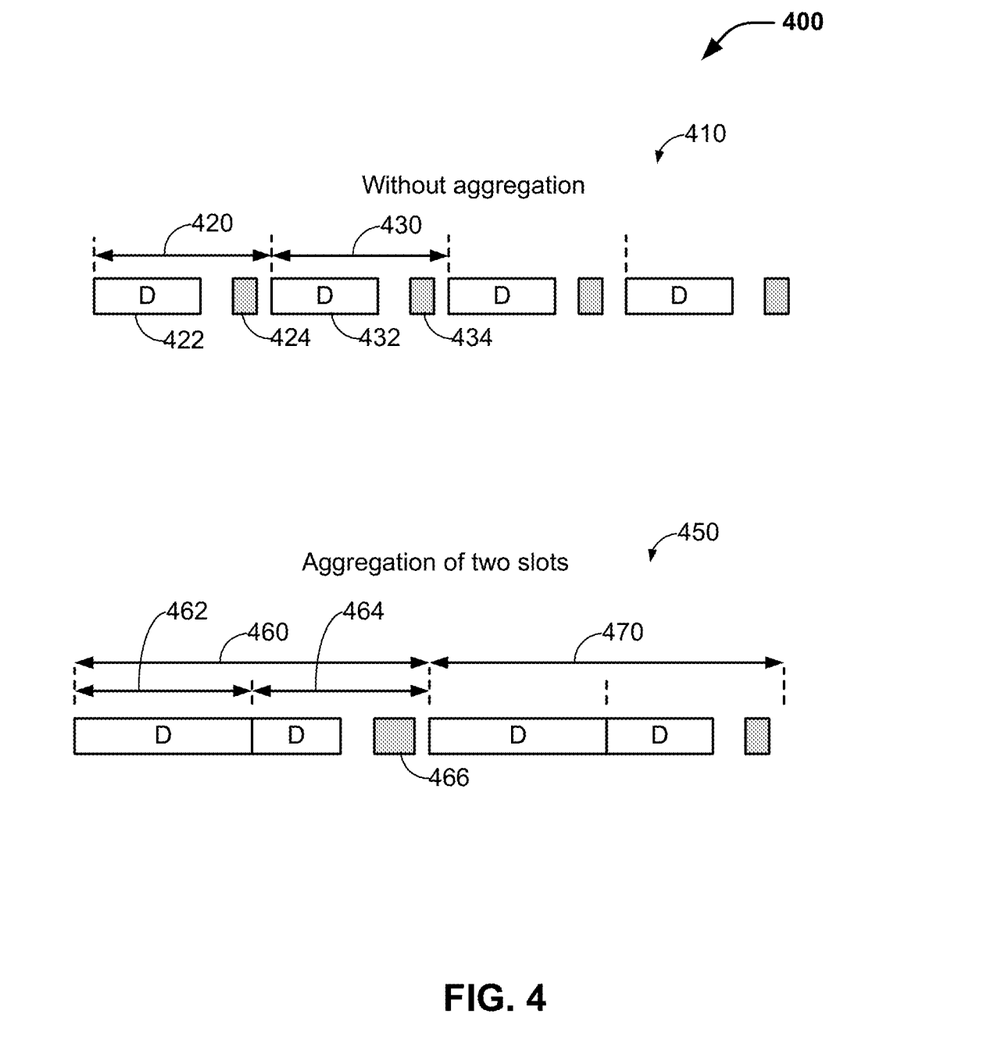
FIG. 4 illustrates example downlink centric slot configurations, without and with slot aggregation, for transmitting a common uplink burst, in aspects of the present disclosure.

FIG. 4 illustrates an example slot aggregation 400 for transmitting a common uplink burst, in aspects of the present disclosure. Although this explanation is based on downlink centric slot aggregation 400, it should be understood that the same or similar principles can be applied to aggregation of uplink centric slots.

For example, gNB 102 may transmit common uplink burst length 181 dynamically or semi-statically to UE 120. In one implementation, gNB 102 may dynamically indicate a common uplink burst length indicator 181 (e.g., identifying a length of the common uplink burst) via, but not limited to, one or more of a downlink control information (DCI) or a slot format indicator channel. The common uplink burst length indicator 181 may be define a number of symbols to use by the common uplink burst. In another implementation, gNB 102 may semi-statically indicate common uplink burst length indicator 181 via a radio resource control (RRC) message, e.g., a RRC reconfiguration message. Upon receiving common uplink burst length indicator 181 from gNB 102, UE 120 and/or common uplink burst function 126 may configure the length 184 of the common uplink burst 182 to correspond to the length identified by the common uplink burst length indicator 181. The duration of use by the UE 120 of the length identified by the common uplink burst length 181 can vary, for example, from fractions of a second, to fractions of a second, to minutes, or to hours based on whether the configuration is dynamic or semi-static. The configuration of common uplink burst length based on information received from gNB 102 applies to both sub-6 GHz spectrum and high (e.g., mmW) spectrum. Additionally, the length identified by the common uplink burst length indicator 181 may be increased as the size of the aggregated downlink centric slot becomes larger (e.g., when compared to 1 downlink centric slot) and the aggregated downlink centric slot supports more data and/or a greater number of users.

In one implementation, slot structure 410 illustrates downlink centric slots, e.g., 420 and 430 without aggregation. Downlink centric slot 420 includes PDCCH/PDSCH 422 and common uplink burst 424. Downlink centric slot 430 includes PDCCH/PDSCH 432 and common uplink burst 434. Common uplink burst 424 and common uplink burst 434 may be the same as or similar to common uplink burst 182 of FIG. 1.

In an additional implementation, slot structure 450 illustrates downlink centric slots, e.g., 460 and 470 with aggregation. For example, aggregated downlink slot 460 may include downlink centric slot 462 aggregated with downlink centric slot 464. Further, slot structure 460 includes one longer common short burst 466, which is longer (e.g., in duration) than the common uplink short bursts defined in slot structure 410. Longer common uplink burst 466 may be the same as or one implementation of common uplink burst 182 of FIG. 1. The longer (e.g., larger capacity) common uplink burst 466 provides support for higher network capacity and/or improved coverage of wireless network. It should be also noted that aggregation may achieved by aggregating three, four, five, etc. slots, and the aggregation with two aggregation slots is a non-limiting example.

Figure 5:
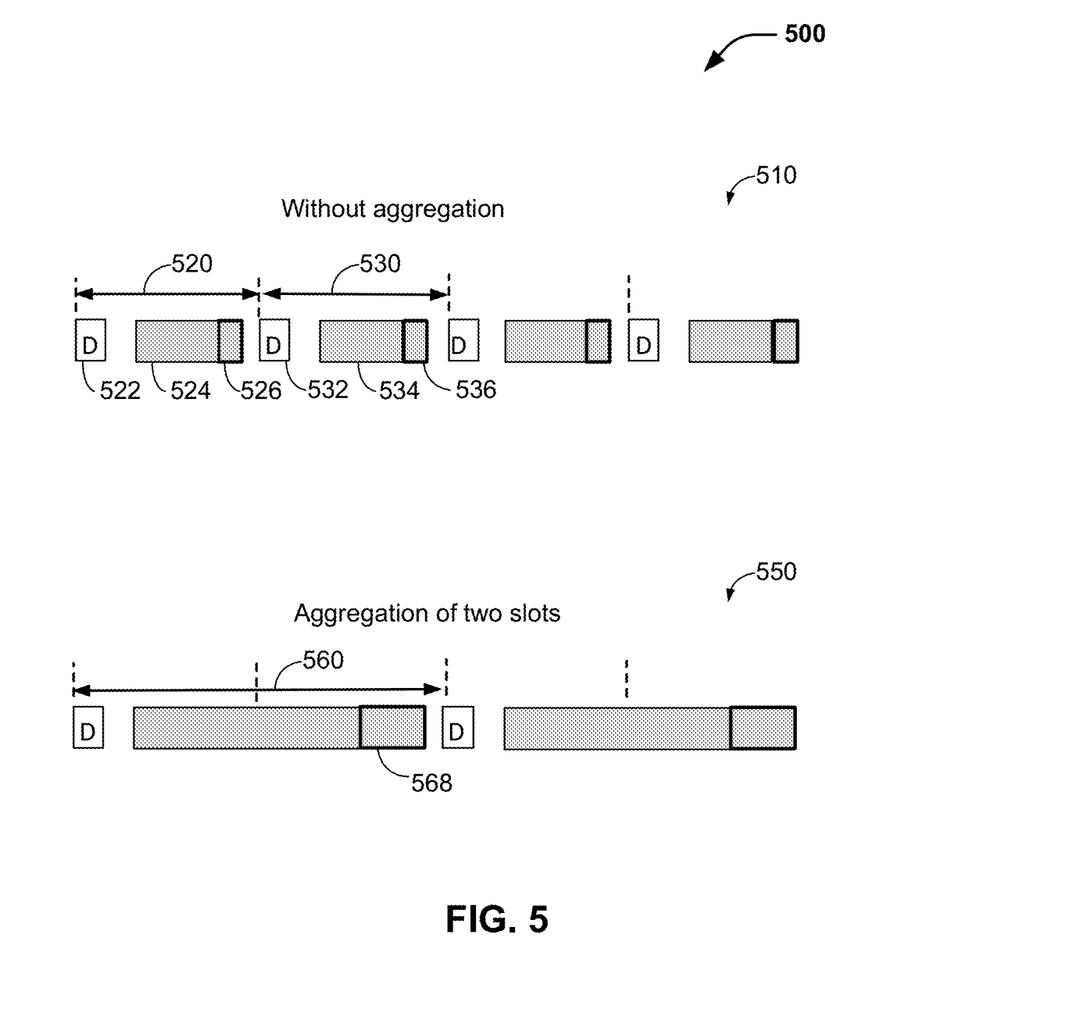
FIG. 5 illustrates example uplink centric slot configurations, without and with slot aggregation, for transmitting a common uplink burst, in aspects of the present disclosure.

FIG. 5 illustrates an example uplink slot aggregation 500 for transmitting a common uplink burst, in aspects of the present disclosure. As described above in reference to FIG. 4 for downlink centric slot, uplink slots may be aggregated in a same or similar manner for transmitting common uplink burst.

In one implementation, slot structure 510 illustrates uplink centric slots, e.g., 520 and 530 without aggregation. Uplink centric slot 520 includes a PDCCH 522, a regular uplink burst 524, and/or a common uplink burst 526. Uplink centric slot 530 includes a PDCCH 532, a regular uplink burst 534, and/or a common uplink burst 536. Common uplink burst 526 and common uplink burst 536 may be the same as or similar to common uplink burst 182 of FIG. 1.

In one implementation, uplink slots 520 and 530 may be aggregated as uplink slot 560 including longer common uplink burst 568. Longer common uplink burst 568 may be the same as or an implementation of common uplink burst 182 of FIG. 1. The longer common uplink burst 568 is longer in duration than the common uplink bursts 526 and 536 in slots 520 and 530. The longer (e.g., larger capacity) common uplink burst 568 provides support for higher network capacity and/or improve coverage of wireless network. It should be also noted that aggregation may achieved by aggregating three, four, five, etc. slots, and the aggregation with two aggregation slots is a non-limiting example.

Figure 6:
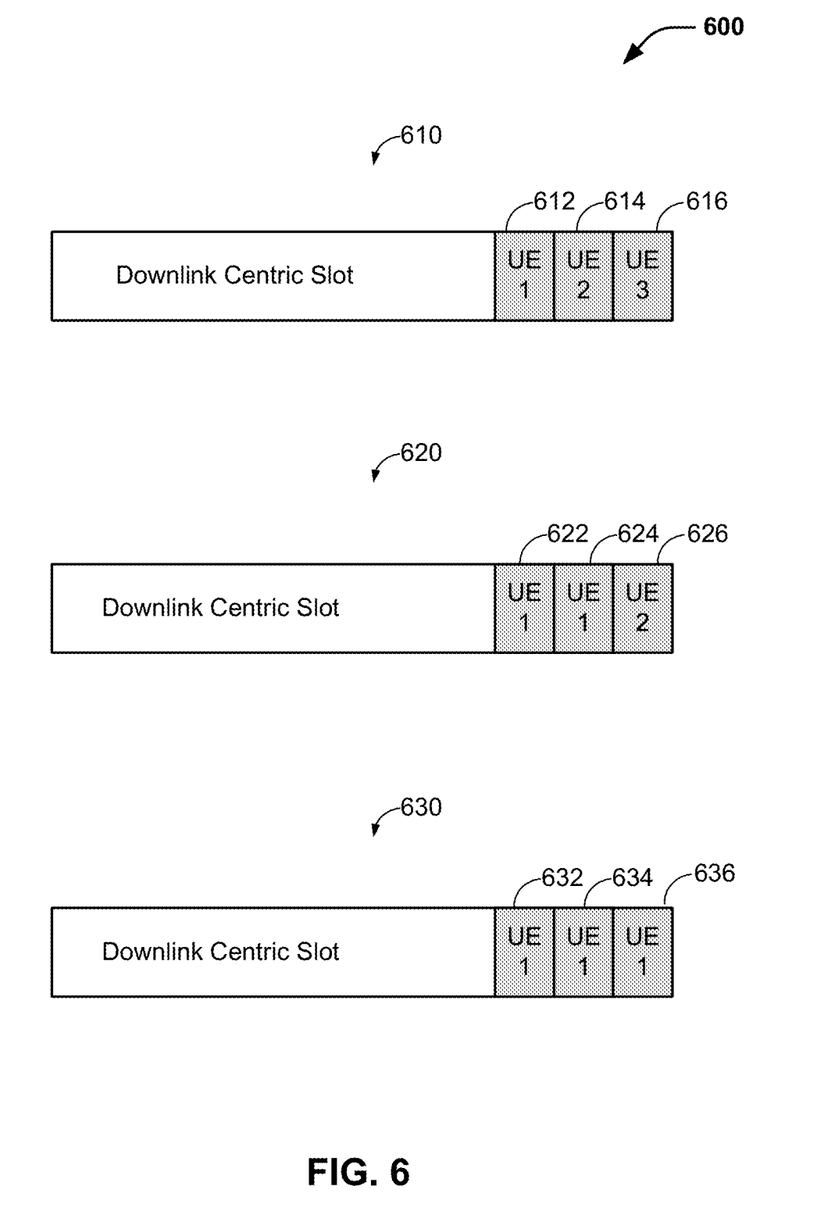
FIG. 6 illustrates an example of a common uplink burst design, in aspects of the present disclosure.

FIG. 6 illustrates an example of a common uplink burst designs 600 that utilizes multiple sets of PUCCH resources to send one or more common uplink bursts, in aspects of the present disclosure. Although common uplink burst designs 600 are explained using examples of downlink centric slots, it should be understood that the same or similar principles can be applied to the design of uplink centric slots.

The longer common uplink burst, which may be longer than one symbol, e.g., longer common uplink short burst 466 of FIG. 4 or 568 of FIG. 5, may be constructed using multiple physical uplink control channel (PUCCH) resources which are multiplexed in a time division multiplexing (TDM) manner. That is, a common uplink burst format or design used for a single symbol or for a set of two or more symbols may be used, and repeated multiple times. This provides flexibility and avoids the need for different channel designs for different lengths of the common uplink burst.

In one implementation, as illustrated in slot structure 610, the common uplink burst may be constructed using three PUCCH resources 612, 614, and 616, such as using three different symbols, where each set of resources is for one of three different UEs, e.g., UEs 1, 2, and 3. In an additional implementation, as illustrated in slot structure 620, the common uplink burst may be constructed using three PUCCH resources 622, 624, and 626, where the first two resources may be used for UE 1 and the third resource may be used for UE 2. In a further additional implementation, as illustrated in slot structure 630, the common uplink burst may be constructed using three PUCCH resources 632, 634, and 636, where all three resources may be used for UE 1. That is, each set of PUCCH resources may be assigned to a different UE or beam (with each UE assigned one beam) and multiple PUCCH resources may be aggregated for a UE to achieve better link budget and/or time diversity. Additionally, the UE 120 may multiplex the PUCCH resources in a TDM manner prior to transmission to gNB 102.

Figure 7:
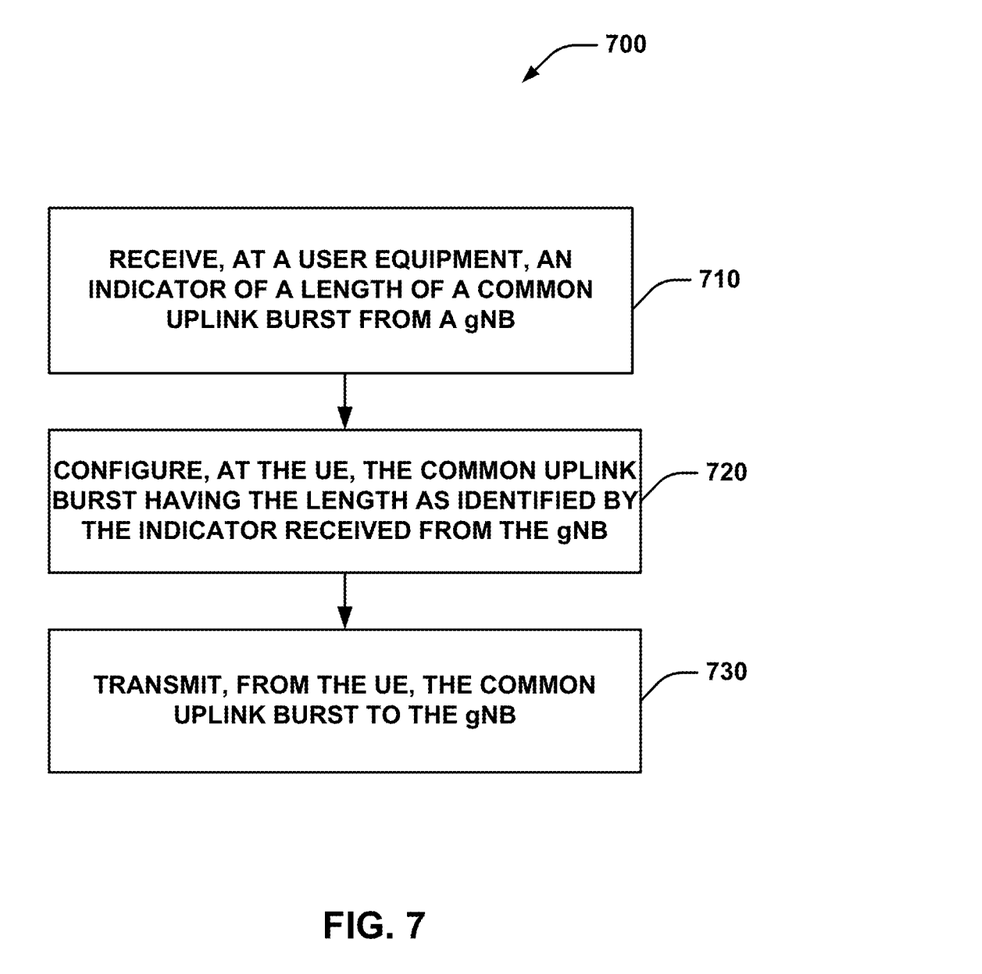
FIG. 7 illustrates an example methodology for wireless communication, such as a UE transmitting a common uplink burst according to aspects of the present disclosure.

FIG. 7 illustrates an example methodology 700 of wireless communication, e.g., for transmitting common uplink burst, such as common uplink burst 182 having length 184 transmitted by UE 120 based on common uplink burst length indicator 181 received from gNB 102, in aspects of the present disclosure.

In an aspect, at block 710, methodology 700 may include receiving, at a user equipment (UE), an indicator of a length of a common uplink burst from a gNB. For example, in an aspect, UE 120 and/or common uplink burst function 126 may include a receiving function 128, such as a specially programmed processor module, or a processor executing specially programmed code stored in a memory, to receive a length of the common uplink burst, such as may be identified in common uplink burst length indicator 181, from gNB 102. The common uplink burst length indicator 181 may be included in one or a combination of types of messages or indications, such as but not limited to, in downlink control information (DCI), in uplink control information (UCI), in a slot format indicator, a control format indicator channel, or a radio resource control (RRC) reconfiguration message. In some cases, a new or different common uplink burst length indicator 181 may be received in each slot. In other cases, the common uplink burst indicator 181 may be received once, and may be applied in more than one slot. For instance, in some cases a common uplink burst may not be sent in every slot, so one form of the common uplink burst indicator 181 transmitted at one time may identify the format for a common uplink burst, while another form of the common uplink burst indicator 181 transmitted at another time may identify when to use the identified resources for the common uplink burst (e.g., the different forms of the common uplink burst indicator 181 may be, for example, the RRC message and the UCI or DCI or slot format indicator or CFI). Further, in some cases, the common uplink burst length indicator 181 may implicitly or explicitly indicate a symbol position of the common uplink burst, such as a starting or ending symbol position or symbol number corresponding to the identified length.

In one example, for instance, the common uplink burst length indicator 181 may be a slot format indicator that identifies a selected one of a plurality of available slot formats. Such available slot formats may include formats having different combinations and positions of resources, e.g., symbols, for use for uplink and/or downlink information. The UE 120 may identify a value of the slot format indicator and correlate the value to one of a plurality of index values of one of a plurality of available slot formats, which may be stored in the memory 136 of the UE 120.

In an aspect, at block 720, methodology 700 may include configuring, at the UE, the common uplink burst having the length identified by the indicator received from the gNB. For example, in an aspect, UE 120 and/or common uplink burst function 126 may include a configuring function 130, such as a specially programmed processor module, or a processor executing specially programmed code stored in a memory, to configure common uplink burst 182 having length 184 identified by the common uplink burst length indicator 181, received from gNB 102. Further, common uplink burst function 126 and/or configuring function 130 can configure the common uplink burst 182 to include control information and/or data information. Also, common uplink burst function 126 and/or configuring function 130 can configure the common uplink burst 182 at a position within slot that may be implicitly or explicitly identified by the common uplink burst length indicator 181. For instance, in the case of the common uplink burst length indicator 181 in the form of a slot format indicator, the indicator may identify an index number of one of a plurality of available slot formats known to UE 120, such as slot formats that may be saved in the memory 136. As such, common uplink burst function 126 and/or configuring function 130 can identify a structure or configuration of uplink and downlink resources, including a position of one or more symbols used for the common uplink burst 182, and generate a slot having the common uplink burst 182 in the identified position. Further, the common uplink burst 182 may be considered a shared uplink portion of a slot, defined by a set of one or more symbols within a slot, where the one or more symbols are shared by more than one slot format.

As mentioned, the common uplink burst 182 may carry control information, and optionally, data information. Suitable examples of information carried by common uplink burst 182 include, but are not limited to, information such as logical information (e.g., an ACK or a NACK), a scheduling request, channel state information (CSI), channel quality information (CQI), and a sounding reference signal (SRS). The type of information includes in the common uplink burst 182 may be identified by the common uplink burst length indicator 181 or other data in a message or transmission that carries the common uplink burst length indicator 181. Further, in some cases, the common uplink burst 182 includes a longer common uplink burst, which further includes one or more physical uplink control channel (PUCCH) resources corresponding to one or more UEs, where multiple PUCCH resources may be used to form a longer common uplink burst. In some case, the common uplink burst 182 may be referred to as a short format uplink burst, while the longer common uplink burst may be referred to as a long format uplink burst. Also, in a slot aggregation scenario, the common uplink burst 182 may be a single common uplink burst configured with more than one slot (e.g., aggregated slots). In some cases, the slots may be aggregated to configure the common uplink burst 182 with the length 184 as identified by the common uplink burst length indicator 181.

As such, the common uplink burst 182 may be considered dynamic and/or variable in that its length (and position) may be changed by gNB 102 by transmitting the common uplink burst length indicator 181 to the UE 120. This provide the gNB 102 with uplink control resource configurability.

In an aspect, at block 730, methodology 700 may include transmitting, from the UE, the common uplink burst to the gNB. For example, in an aspect, UE 120 and/or common uplink burst function 126 may include a transmitting function 132, such as a specially programmed processor module, or a processor executing specially programmed code stored in a memory, to transmit the common uplink burst, e.g., common uplink burst 182 to gNB 102. The common uplink burst 182 is transmitted from UE 120 with the length 184 (and position) corresponding to the common uplink burst length indicator 181 received from gNB 102.

In some cases, the common uplink bursts may be transmitted in "aggregated" downlink-centric or uplink-centric slots, to make room for larger common uplink bursts. In some aspects, for instance, the common uplink burst may be spreading control channel data across multiple channels, or may be transmitted on a single channel. In various aspects, information transmitted via common uplink burst may include SRS scheduling information, channel status information (CSI), acknowledgement information (ACK/NACK), and the like.

Figure 8:
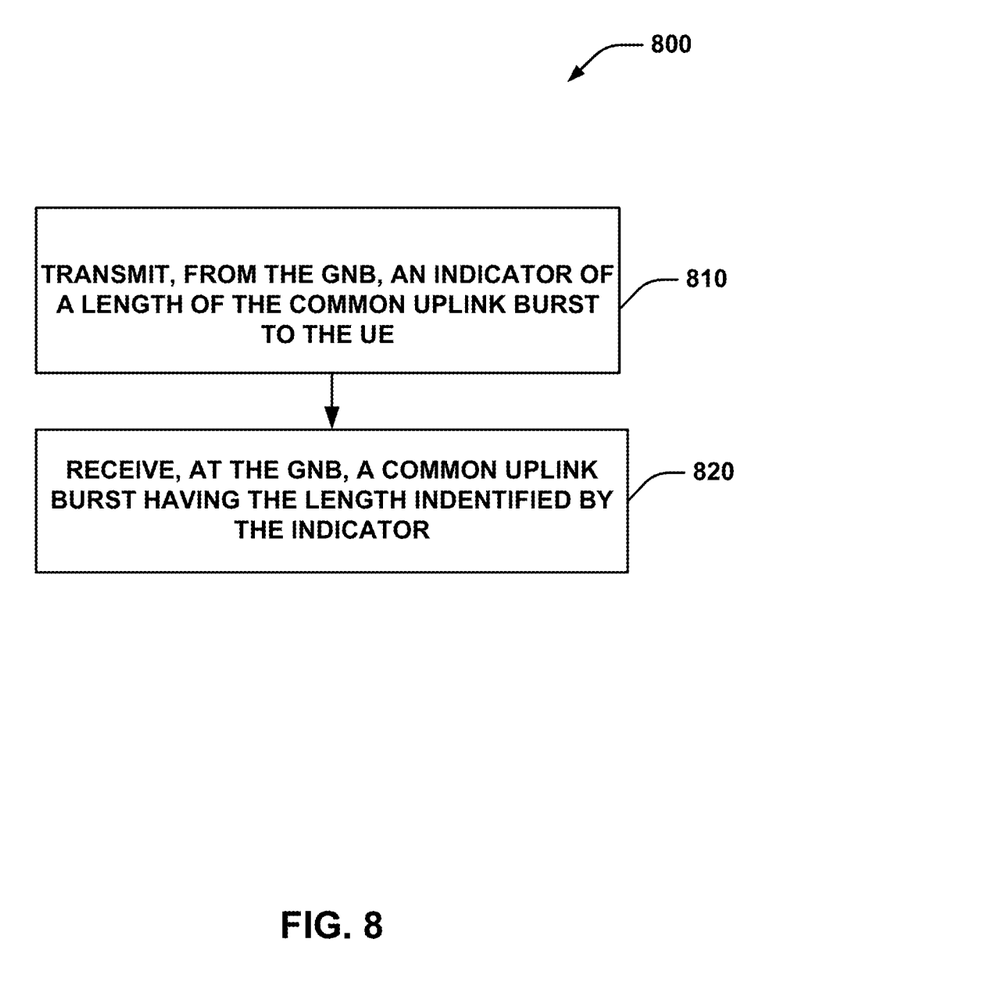
FIG. 8 illustrates an example methodology for wireless communications, such as between a gNB and a UE according to the various aspects of the present disclosure.

FIG. 8 illustrates an example methodology 800 for transmitting common uplink burst, in aspects of the present disclosure.

In an aspect, at block 810, methodology 800 may include transmitting, from a gNB, an indicator of a length of a common uplink burst to a user equipment (UE). For example, in an aspect, gNB 102 and/or common uplink burst configuration function 106 may include a specially programmed processor module, or a processor executing specially programmed code stored in a memory, to transmit an indicator of a length of the common uplink burst, e.g., common uplink burst length indicator 181, from gNB 102. In some aspects this may include transmitting the common uplink burst length indicator 181 via or with one or a combination of downlink control information (DCI), uplink control information (UCI), a slot format indicator, a control format indicator channel, or a radio resource control (RRC) reconfiguration message. The common uplink burst length indicator 181 may have one or more additional attributes, as discussed in detail above.

In an aspect, at block 820, methodology 800 may include receiving, at the gNB, the common uplink burst from the UE, wherein the common uplink burst has the length corresponding to the indicator transmitted from the gNB. For example, in an aspect, gNB 102 and/or common uplink burst configuration function 106 may include a specially programmed processor module, or a processor executing specially programmed code stored in a memory, to receive the common uplink burst 182 configured by a UE 120 with the length 184 as identified by the common uplink burst length indicator 181, transmitted by gNB 102. The common uplink burst 182 may have one or more additional attributes, as discussed in detail above.

Thus, as described above in reference to FIGS. 1-8, gNB 102 may configure the length of the common uplink burst and UE 120 may transmit the common uplink burst based on the configuration information (e.g., length of the common uplink burst) received from the gNB to improve performance of 5G/NR networks.

As used in this application, the terms "function," "process," "system" and the like are intended to include a computer-related entity, such as but not limited to hardware, firmware, a combination of hardware and software, software, or software in execution. For example, a module may be, but is not limited to being, a process running on a processor, a processor, an object, an executable, a thread of execution, a program, and/or a computer. By way of illustration, both an application running on a computing device and the computing device can be a process. One or more modules can reside within a module and/or thread of execution and a module may be localized on one computer and/or distributed between two or more computers. In addition, these modules can execute from various computer readable media having various data structures stored thereon. The processes may communicate by way of local and/or remote modules such as in accordance with a signal having one or more data packets, such as data from one module interacting with another module in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Several aspects of improved measurement event reporting message associated with a tune away have been presented with reference to a W-CDMA system. As those skilled in the art will readily appreciate, various aspects described throughout this disclosure may be extended to other telecommunication systems, network architectures and communication standards.

By way of example, various aspects described herein related to RACH preamble transmission may be extended to other UMTS and/or LTE and/or other systems where UE has bursty data to transmit which is not suitable for establishing a dedicated channel (e.g., during a forward access channel (CELL_FACH) state)). For example, such UMTS systems may include TD-SCDMA, High Speed Downlink Packet Access (HSDPA), High Speed Uplink Packet Access (HSUPA), High Speed Packet Access Plus (HSPA+) and TD-CDMA. Also, such LTE and/or other systems may include Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for."

What is claimed is:

1. A method of communication in a wireless communication device, comprising:
   receiving, at a user equipment (UE), an indicator of a length of a common uplink burst from a base station;
   configuring, at the UE, the common uplink burst having the length as identified by the indicator received from the base station; and
   transmitting, from the UE, the common uplink burst to the base station.

2. The method of claim 1, wherein receiving the indicator of the length of the common uplink burst comprises receiving via one or more of a downlink control information (DCI), an uplink control information (UCI), a slot format indicator, a control format indicator channel, or a radio resource control (RRC) reconfiguration message.

3. The method of claim 1, wherein the common uplink burst includes a longer common uplink burst, which further includes one or more physical uplink control channel (PUCCH) resources corresponding to one or more UEs.

4. The method of claim 1, wherein transmitting the common uplink burst comprises transmitting a single one of the common uplink burst with aggregated slots.

5. The method of claim 1, wherein transmitting the common uplink burst comprises aggregating downlink-centric slots to make room for the common uplink burst of the length corresponding to the indicator.

6. The method of claim 1, wherein transmitting the common uplink burst comprises aggregating uplink-centric slots to make room for the common uplink burst of the length corresponding to the indicator.

7. The method of claim 1, wherein transmitting the common uplink burst comprises transmitting the common uplink burst having a short format.

8. The method of claim 1, wherein transmitting the common uplink burst comprises transmitting the common uplink burst having a long format.

9. The method of claim 1, wherein the common uplink burst comprises at least one of an acknowledgement (ACK), a negative acknowledgement (NACK), a scheduling request, a channel state information (CSI) or a channel quality information (CQI).

10. The method of claim 1, wherein the indicator comprises the length of the common uplink burst and a starting symbol for the common uplink burst.

11. A method of communication in a wireless communication device, comprising:
    transmitting, from a base station, an indicator of a length of a common uplink burst to a user equipment (UE); and
    receiving, at the base station, the common uplink burst from the UE, wherein the common uplink burst has the length identified by the indicator transmitted from the base station.

12. The method of claim 11, wherein transmitting the indicator of the length of the common uplink burst comprises transmitting via one or more of a downlink control information (DCI), an uplink control information (UCI), a slot format indicator, a control format indicator channel, or a radio resource control (RRC) reconfiguration message.

13. The method of claim 11, wherein the common uplink burst includes a longer common uplink burst, which further includes one or more physical uplink control channel (PUCCH) resources corresponding to one or more UEs.

14. The method of claim 11, wherein receiving the common uplink burst comprises receiving a single one of the common uplink burst with aggregated slots.

15. The method of claim 11, wherein receiving the common uplink burst comprises receiving the common uplink burst having a short format.

16. The method of claim 11, wherein receiving the common uplink burst comprises receiving the common uplink burst having a long format.

17. The method of claim 11, wherein the common uplink burst comprises at least one of an acknowledgement (ACK), a negative acknowledgement (NACK), a scheduling request, a channel state information (CSI) or a channel quality information (CQI).

18. A user equipment (UE) for wireless communication, comprising:
- a transceiver;
- a memory; and
- a processor coupled to the transceiver and the memory and configured to:
  - receive an indicator of a length of the common uplink burst from a base station; and
  - configure the common uplink burst having the length as identified by the indicator received from the base station; and
  - transmit the common uplink burst to the base station.

19. The UE of claim 18, wherein the transceiver is configured to receive the indicator of the length of the common uplink burst via one or more of a downlink control information (DCI), an uplink control information (UCI), a slot format indicator, a control format indicator channel, or a radio resource control (RRC) reconfiguration message.

20. The UE of claim 18, wherein the common uplink burst includes a longer common uplink burst, which further includes one or more physical uplink control channel (PUCCH) resources corresponding to one or more UEs.

21. The UE of claim 18, wherein the processor is further configured to transmit a single one of the common uplink burst with aggregated slots.

22. The UE of claim 18, wherein the processor is further configured to aggregate downlink-centric slots to make room for the common uplink burst of the length corresponding to the indicator.

23. The UE of claim 18, wherein the processor is further configured to aggregate uplink-centric slots to make room for the common uplink burst of the length corresponding to the indicator.

24. The UE of claim 18, wherein the processor is further configured to transmit the common uplink burst having a short format.

25. The UE of claim 18, wherein the processor is further configured to transmit the common uplink burst having a long format.

26. The UE of claim 18, wherein the common uplink burst comprises at least one of an acknowledgement (ACK), a negative acknowledgement (NACK), a scheduling request, a channel state information (CSI) or a channel quality information (CQI).

27. A base station for wireless communications, comprising:
- a transceiver;
- a memory;
- a processor coupled to the transceiver and the memory and configured to:
  - transmit an indicator of a length of a common uplink burst to a user equipment (UE); and
  - receive the common uplink burst from the UE, wherein the common uplink burst has the length identified by the indicator transmitted from the base station.

28. The base station of claim 27, wherein the processor is configured to transmit the indicator of the length of the common uplink burst via one or more of a downlink control information (DCI), an uplink control information (UCI), a slot format indicator channel, a control format indicator channel, or a radio resource control (RRC) reconfiguration message.

29. The base station of claim 27, wherein the common uplink burst includes a longer common uplink burst, which further includes one or more physical uplink control channel (PUCCH) resources corresponding to one or more UEs.

30. The base station of claim 27, wherein the processor is further configured to receive a single one of the common uplink burst with aggregated slots.

31. The base station of claim 27, wherein the processor is further configured to receive the common uplink burst having a short format.

32. The base station of claim of claim 27, wherein the processor is further configured to receive the common uplink burst having a long format.

33. The base station of claim 27, wherein the common uplink burst comprises at least one of an acknowledgement (ACK), a negative acknowledgement (NACK), a scheduling request, a channel state information (CSI) or a channel quality information (CQI).

* * * * *